United States Patent

Szabo et al.

[15] 3,705,365
[45] Dec. 5, 1972

[54] COMMON MODE NOISE CANCELLATION SYSTEM

[72] Inventors: Andras I. Szabo, Export; Miklos Sarkozi, Monroeville, both of Pa.

[73] Assignee: Westinghouse Electric Corporation, Pittsburgh, Pa.

[22] Filed: Feb. 11, 1971

[21] Appl. No.: 114,473

[52] U.S. Cl................333/12, 330/30 D, 330/69, 330/149
[51] Int. Cl..................H04b 3/28, H04b 3/30
[58] Field of Search..........333/12, 24; 330/30 D, 149, 330/69; 178/45; 179/78, 81, 174; 325/357, 371; 307/89–91

[56] References Cited

UNITED STATES PATENTS

| | | | |
|---|---|---|---|
| 3,212,004 | 10/1965 | Rumoller | 333/12 X |
| 2,280,950 | 4/1942 | Harder | 333/12 X |
| 3,373,373 | 3/1968 | McClure | 333/25 X |
| 3,223,920 | 12/1965 | Sasaki | 333/12 X |

Primary Examiner—Herman Karl Saalbach
Assistant Examiner—Marvin Nussbaum
Attorney—F. H. Henson and R. G. Brodahl

[57] ABSTRACT

For use with a pair of signal conductors supplying signals to a utilization circuit, means for reducing unwanted common mode noise comprising a transformer device having two highly symmetrical windings each connected at one end to a different one of the two conductors and connected at their opposite ends to an electrical utilization circuit, for example and preferably having a balanced input (such as a differential amplifier) affording a degree of common mode rejection capability. A third winding on the transformer, having the same number of turns as each of the first two windings has supplied to it a voltage substantially equal to the common mode voltage of the signal conductors, whereby the voltages across all three windings will be substantially the same, those across the first two windings acting to oppose and cancel common mode voltages.

16 Claims, 6 Drawing Figures

3,705,365

PATENTED DEC 5 1972

COMMON MODE NOISE CANCELLATION SYSTEM

CROSS-REFERENCES TO RELATED APPLICATIONS

Patent Application Ser. No. 114,621 entitled Signal Transmission System, filed concurrently herewith by A. I. Szabo, P. J. Hite and M. Sarkozi and assigned to the same assignee, is also directed to noise reduction in a signal transmission system.

BACKGROUND OF THE INVENTION

As is known, there is an increasing need for instrumentation systems which will provide accurate information on a large number of measured variables for data logging and control purposes. In many such applications, such as industrial control, the information is often in the form of low-level electrical signals generated by remotely located sensing elements such as thermocouples, strain gauges or the like. The task of collecting and processing these signals in an industrial environment heavily contaminated with electrical noise presents a serious problem in all instrumentation systems. This noise comprises in-phase or "common mode" voltages which are induced in the transmission lines connecting the sensors to a computer or the like by stray electromagnetic fields which inherently exist in an industrial environment.

The problem of common mode noise is aggravated by the fact that in certain cases the electrical information from various sensors must be processed to a high degree of accuracy, while the unwanted noise exceeds the useful signal level by several orders of magnitude. Further difficulties are encountered when several signal channels are multiplexed at the central processing equipment of a computer, for example. That is, the multiplexing switch is subjected to the potential differences between the channels grounded at distant locations.

With good instrumentation practices using twisted conductors in shielded cables and discriminate grounding, much of the interference can be prevented and eliminated. The technique of using a two-wire signal transmission line applied to a balanced input amplifier provides an efficient way to reduce the effect of the external interference. Depending upon the degree of electrical symmetry of the system, a large part of the unwanted signal appears as in-phase or common mode signals on the inputs to the amplifier. Much of the common mode signal is rejected to a degree defined by the practical system, perfect symmetry of the signal paths and a large common mode rejection ratio cannot be achieved. Consequently, conversion of some of the common mode noise to normal mode noise takes place with a consequent reduction in the signal to noise ratio. To achieve high accuracy of low-level signals under 100 millivolts in the presence of a large noise having peaks of up to 100 volts, an extremely high common mode rejection ratio would be required; however this requirement far exceeds the performance of presently available amplifiers.

Furthermore, the problem of time multiplexing a large number of signal channels at a high rate in the presence of severe electromagnetic interference has not yet found a reliable and economic solution. Prior to this time, expensive electromechanical switches were used where the potential difference between the channels is grounded at various locations exceeded the breakdown voltages of currently available semiconductor switches. This raises a serious limitation to the speed and reliability of a multiplexing system.

SUMMARY OF THE INVENTION

In accordance with the present invention, apparatus is provided including a transmission line having at least two conductors for connecting a signal source, for example a balanced transducer, to electrical utilization apparatus. Means are provided for preventing common mode noise signals induced in the two signal conductors from appearing at the input of the electrical utilization apparatus comprising a transformer having three windings thereon, two of the windings being connected between an end of a respective one of the two conductors of the transmission line an input terminal of said utilization apparatus, and the third of the windings being connected to a source of voltage substantially equal to the common mode voltage of the signal conductors. One end of the third winding is connected to ground. Each of the windings has the same number of turns thereon whereby the voltages induced in all three windings will be the same. Since the third winding is connected to ground, the potential at its grounded end, as well as the potentials on the first two windings adjacent the utilization apparatus will be essentially zero, the voltages across the first two windings acting to oppose and cancel any common mode voltages before they reach the utilization apparatus.

In one embodiment the source of voltage connected to the third winding of the transformer is a third conductor running close to and along the length of the signal conductors, i.e., generally parallel to and substantially the same length as the transmission line. One end of the third conductor is connected to one end of the third winding, while the opposite end of that conductor is connected to ground at the signal source. The other end of the third winding is connected to ground for example through an impedance network having low impedance to noise frequencies and high impedance to D.C. One example of such a third conductor running generally parallel to the signal conductors is a conductive shield encircling the signal conductors in the usual manner of a shielded transmission line. Since the third conductor runs along and close to the signal conductors it is subject to substantially the same stray electromagnetic fields which induce in it a voltage substantially equal to the common mode voltage of the signal conductors In another embodiment, the voltage applied to the third winding of the transformer may be derived from the common mode voltage of the signal conductors, for example by means of a voltage follower whose input is connected to the signal conductors, and whose output is connected to the third winding of the transformer.

The utilization apparatus, may for example be and preferably is a differential amplifier having a degree of common mode rejection itself. The transformer apparatus of the invention, however, has the ability to eliminate common mode voltages of much higher magnitude than the balanced amplifier. The apparatus of the invention may be used in connection with a single transmission line or in combination with multiplexing apparatus wherein a plurality of transmission lines are selectively connected through switches to a common differential amplifier or the like.

The above and other features of the invention will become apparent from the following detailed description taken in connection with the accompanying drawings which form a part of this specification, and in which.

Figure 1:
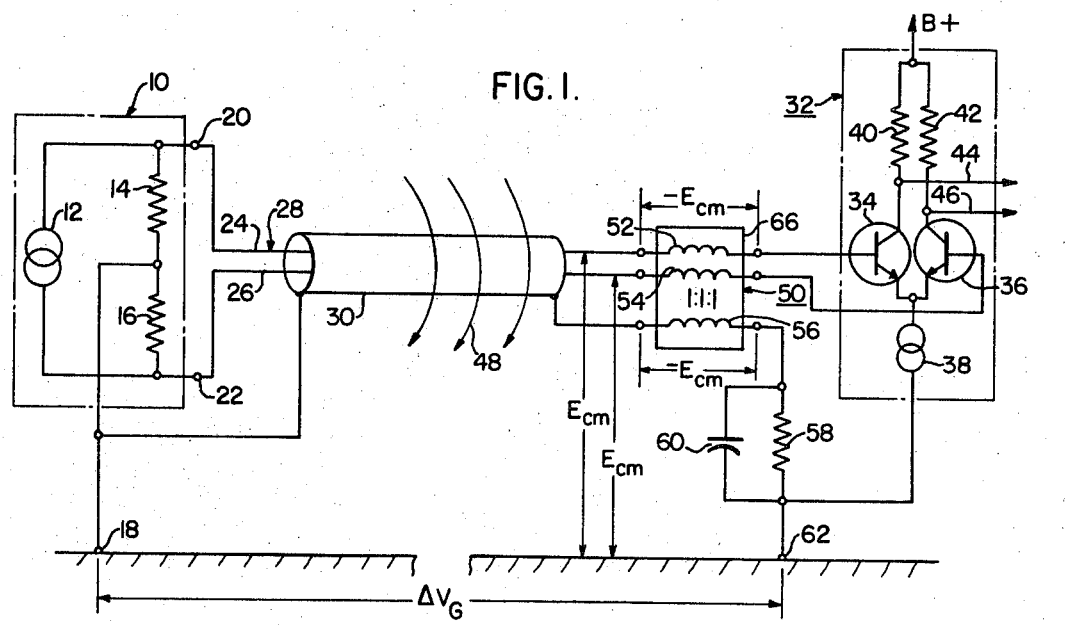
FIG. 1 is a schematic circuit diagram of one embodiment of the invention.

With reference now to the drawings, and particularly to FIG. 1, the system shown includes a signal source, for example the transducer 10 comprising a current source 12 and a pair of impedances, such as resistors 14 and 16, connected across its output terminals. The junction of resistors 14 and 16 is connected to ground at 18; while the output signal from the transducer 10 appears between terminals 20 and 22. These two terminals 20 and 22 are connected to the two conductors 24 and 26, respectively, of a transmission line 28. The transmission line 28 comprises the two conductors 24 and 26 which are usually twisted to provide a degree of electrical symmetry. An outer shield 30 of electrical conducting material surrounds the conductors 24 and 26, and provides a conductor that is disposed generally parallel to the transmission line 28. The ends of the conductors 24 and 26 opposite the signal transducer 10 are connected to the input of an electrical utilization circuit which, in the usual case, will comprise a differential amplifier having a pair of transistors 34 and 36 with their emitters connected through a constant current source 38 to ground. The collectors of the transistors 34 and 36, in turn, are connected to a source of B + potential through resistors 40 and 42. The transistors 34 and 36 are as closely matched as possible, as are the resistors 40 and 42. The two conductors or wires 24 and 26 are connected to the bases of transistors 34 and 36, respectively.

An output will appear on output terminals 44 and 46 in response to a differential signal applied to the bases of transistors 34 and 36. A differential signal of this type establishes different potentials on the two bases of the transistors such that one transistor will conduct more than the other to produce a differential output across terminals 44 and 46. However, the circuit is designed such that when common mode signals are applied to the basis of both transistors 34 and 36 (i.e., signals in-phase and of the same amplitude), the transistors 34 and 36 will conduct in the same amount and no differential output will appear across output terminals 44 and 46. As was explained above, however, the common mode rejection ratio of an amplifier of this type is relatively low; while the amplifier must be capable of amplifying low-level differential signals, under 100 millivolts, in the presence of large noise, up to 100 peak volts. This requirement far exceeds the performance of presently available differential amplifiers.

Stray electromagnetic fields, schematically illustrated by the flux lines 48 in FIG. 1, will induce common mode voltages in the two wires 24 and 26 and a substantially equal voltage in the shield 30. This may be explained by considering that the respective current loops associated with the conductor 24, 26 and 30 are subjected to the same stray electromagnetic fields, and thereby induce substantially equal voltages in the respective conductors. Since the third conductor 30 is substantially the same length as the signal conductors 24 and 26, and is sufficiently close to the signal conductors to be affected by substantially the same stray electromagnetic fields, the stray fields will induce in conductor 30 a voltage substantially equal to the common mode voltage induced in the signal conductors.

As shown in FIG. 1, the end of the shield 30 adjacent the transducer 10 is grounded at 18. The common mode voltages, $E_{cm}$, would normally appear at the input of differential amplifier 32 if connected directly to the signal conductors; and assuming that they are of such magnitude as to exceed the common mode input range of the amplifier, an erroneous differential output would appear at the terminals 44 and 46, and at the same time might permanently damage the amplifier.

In accordance with the present invention, the common mode voltages induced in the signal conductors 24 and 26 are substantially eliminated by means of a transformer 50 provided with a magnetically permeable core having three windings 52, 54 and 56 thereon. One end of the winding 52 is connected to the output end of wire 24 and at the other end to an input terminal of amplifier 32. Similarly, the second winding 54 is connected at one end to the output end of wire 26 and at the other end to the other input terminal of amplifier 32. The third winding 56 is connected to the shield 30 at the end opposite transducer 10 and is connected at its other end through a resistance-capacitance network 58, 60 to ground at 62. The capacitor 60 provides a low impedance path for common mode voltage frequencies, while the resistor provides damping at the resonant frequency of the circuit including the winding 56 and capacitor 60. The resistance capacitor network parameters are such as to render high impedance to D.C. currents to prevent saturation of the transformer core. The points 18 and 62, while both grounded are actually not at the same potential but differ by an amount equal to $V_G$.

Since all of the windings 52, 54 and 56 are inductively coupled on a common magnetically permeable core and have the same number of turns, the voltages induced in all windings will be the same. Furthermore, since the right end of winding 56 is connected to ground (the impedance of resistor 58 and capacitor 60 being very low), the potential at the right end of winding 56 must be at ground potential, or very nearly ground potential. Similarly, the voltages on the right ends of windings 52 and 54 must also be essentially zero, or at ground potential. The overall effect is that a voltage $-E_{cm}$, is induced across the windings 52 and 54 which oppose and substantially cancels the common mode voltages, $E_{cm}$, (or, more accurately, $+E_{cm}$) induced in the wires 24 and 26. The current path for currents flowing through winding 56 is through ground, the shield 30, winding 56 and the resistance-capacitance network 58, 60.

For the common mode cancellation technique shown in FIG. 1 to be optimally effective, it is necessary that: (1) both the signal source and the conductor 30 parallel to the transmission line 28 must be connected to a common signal ground (as hereinbefore noted the conductor 30 is shown by way of example as a shield around the wires 24 and 26); (2) the resistance of the conductor 30, and the current drawn by the third winding 56 of transformer 50, should be low; and (3) the windings on transformer 50, especially the signal windings, should be perfectly symmetrical to achieve identical signal winding voltage. The transformer 50 preferably is in a magnetically and electrostatically shielding enclosure, identified by the reference numeral 66 in FIG. 1.

An important reason for the necessity of a high degree of symmetry between the "signal windings" 52 and 54, is to avoid intolerable normal mode noise that would inevitably be introduced by the degree of disymmetry such as would occur between separately wound signal windings, especially in high speed scan instrumentation systems such as in computerized process control in a high common mode noise generating environment.

Figure 2:
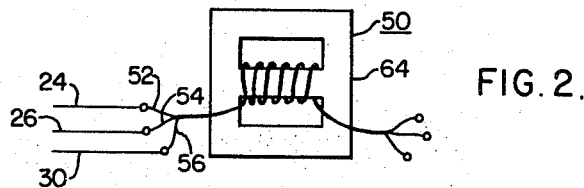
FIG. 2 is an illustration of one type of trifilar inductor or transformer which can be used in the circuitry of FIG. 1.

One way of achieving the necessary as near perfect as possible symmetry between the signal windings is to wind the three windings in trifilar form as shown in FIG. 2 wherein the transformer 50 comprises a core 64 having three twisted wires 52, 54 and 56 wound therearound to form the three windings. Due to the tight magnetic and capacitive coupling between the three windings of the trifilar inductor, which are connected to elements 24, 26 and 30, respectively, common mode signals of equal amplitude and phase are induced in the signal paths with opposing polarities as explained above such that the common mode voltage of the signal channel at the input terminals of the amplifier is reduced. The three wires 52, 54 and 56 twisted together are designed to provide three balanced windings. That is, all three wires are similar high gauge insulated conductors twisted symmetrically and held together with an external layer of insulating material.

Figure 3:
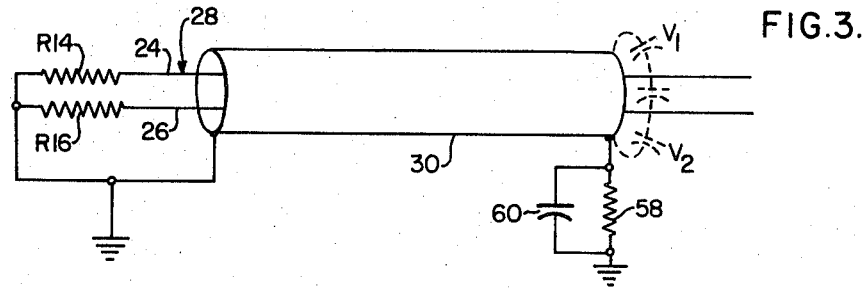
FIG. 3 is an equivalent circuit diagram showing the effect of unbalanced inputs on the two wires of the transmission lines.

While the trifilar winding shown in FIG. 2 is satisfactory for most applications where a true balanced input is applied to the wires 24 and 26, this requires that the two resistors 14 and 16 in transducer 10 be identical. There are cases, however, where the resistances of the two resistors 14 and 16 may vary, giving rise to undesirable common mode currents in the system. This is illustrated by the equivalent circuit diagram in FIG. 3. Capacitive coupling will occur between the two wires 24 and 26 and the shield 30, thereby causing currents to flow in wires 24 and 26 and producing voltages $V_1$ and $V_2$ between the two wires 24 and 26 and the shield 30, which is grounded. Assuming that the resistances $R_{14}$ and $R_{16}$ of resistors 14 and 16 are equal, the system will remain balanced and $V_1$ will be equal to $V_2$ and no undesirable common mode to differential mode conversion occurs. However, if it should happen that the resistance $R_{14}$ and $R_{16}$ are not equal, then $V_1$ and $V_2$ will not be equal, that is, an undesirable differential mode component is produced. It is desirable, therefore, to eliminate as much as possible any capacitive coupling between the wires 24 and 26 and the shield 30.

Figure 4:
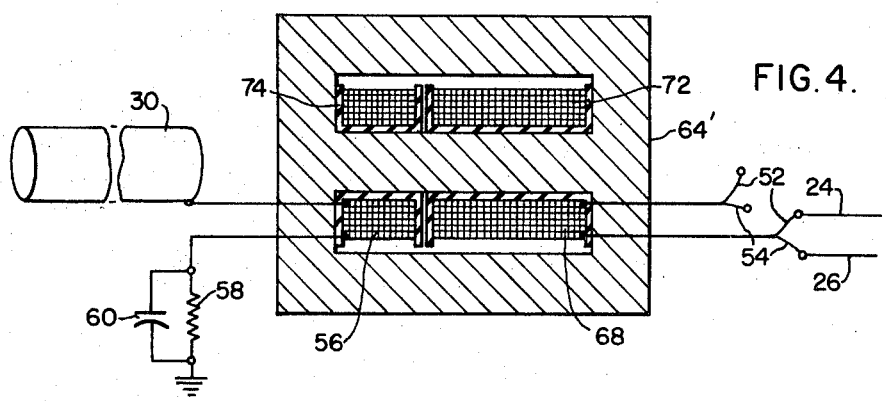
FIG. 4 illustrates an inductor or transformer having bifilar signal windings separated from the third winding for eliminating or reducing the effect of unbalanced inputs explained in connection with FIG. 3.

A high degree of symmetry between the signal windings and a better degree of capacitive isolation can be afforded utilizing the transformer arrangement shown in FIG. 4 which again includes a core 64'. In this case, however, the two insulated conductors 52 and 54, twisted together as a bifilar wire, are wound around the core to provide a dual-winding coil 68 which is spaced from winding 56 comprising a single wire connected at one end to the shield 30 and its other end to the resistance-capacitance network 58, 60 and, hence, to ground. The dual-winding refers to windings 52 and 54. The number of turns on the windings 52, 54 and 56 is the same. Since the two coils 68 and 56 are now separated, a more effective isolation of the two is provided to reduce capacitive coupling between the signal wires 24 and 26 and the shield 30 with a consequent reduction of the differential mode voltage due to a difference in the resistances $R_{14}$ and $R_{16}$ shown in FIG. 3. Note that the two coils 68 and 56 are wound on separated, individual nylon or the like bobbins 72 and 74, respectively.

Figure 5:
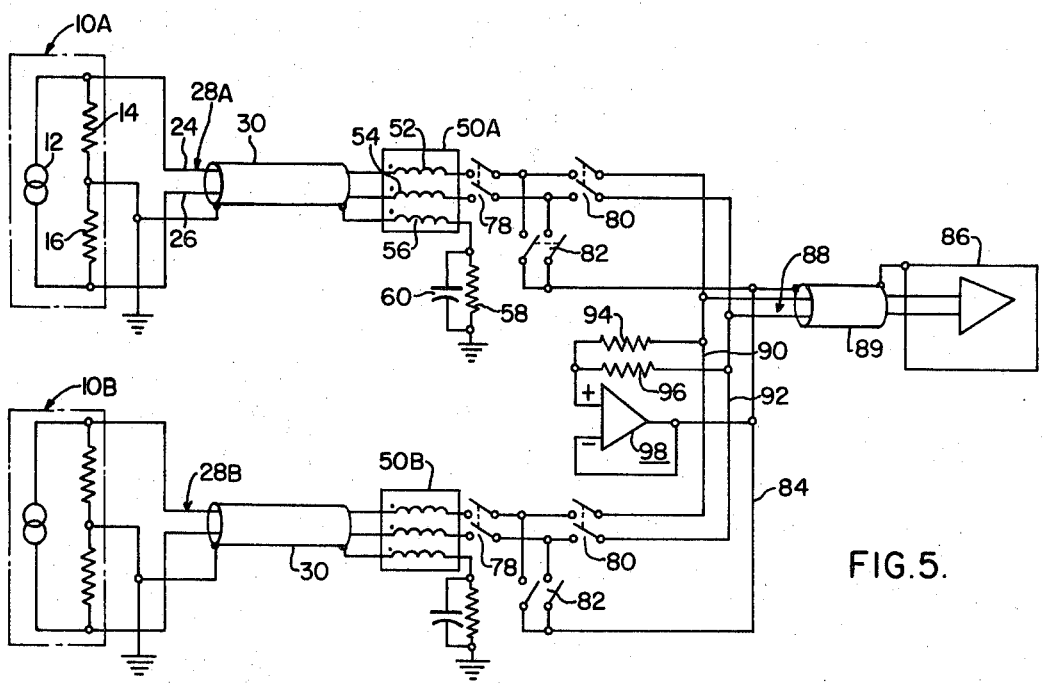
FIG. 5 illustrates a multiplexing scheme with which the present invention may be used.

With reference now to FIG. 5, a multiplexing scheme is shown utilizing the common mode rejection techniques of the invention. The system includes two balanced signal transducers 10A and 10B, two transmission lines 28A and 28B and their associated respective shields 30, and two three-winding transformers 50A and 50B. The operation of each transmission line and its associated transformer and conductor 30 is the same as that described in connection with FIG. 1. Elements in FIG. 5 which correspond to those shown in FIG. 1 are identified by like reference numerals.

The outputs of the two channels shown in FIG. 5 are applied to multiplexer switches which, in the drawing, are represented by familiar switch symbols. However, in an actual multiplexer, semiconductor switches perform the switching functions and these semiconductor switches, in turn, are connected to a control circuit.

The switching arrangement for each channel consists of two series switches 78 and 80 in each signal path and a shunt switch 82 connected between the series switches' common point and a bus 84 which is common to all other shunt switches. The operation of the switches is such that for a selected channel, both series switches 78 and 80 will be closed in each of the two signal leads; while both shunt switches 82 are open. At the same time, all other channels have their series switches open and their shunt switches closed. This action permits only one channel to be applied to a utilization device 86, for example an analog-to-digital converter, through a second two-wire transmission line 88 surrounded by a shield 89. In this respect, the series switches from the two signal leads of each channel are connected to two buses 90 and 92 that couple the input data to the analog-to-digital converter 86. The type of converter used in most applications will be one which converts an input voltage to a frequency. Both signal buses 90 and 92 are also connected through equal value resistors 94 and 96, which form a potential divider, to the input terminal of a voltage follower 98. The output of the follower 98 is connected to the shunt switching bus 84 and also to the analog-to-digital converter guard or case through the shield 89 of the transmission line 88. The follower arrangement produces on its output line 84 a voltage derived from the signal lines 90 and 92 and equal to the common mode voltage on these lines. Thus the follower arrangement reproduces the common mode voltage of the signal lines 90 and 92.

Figure 6:
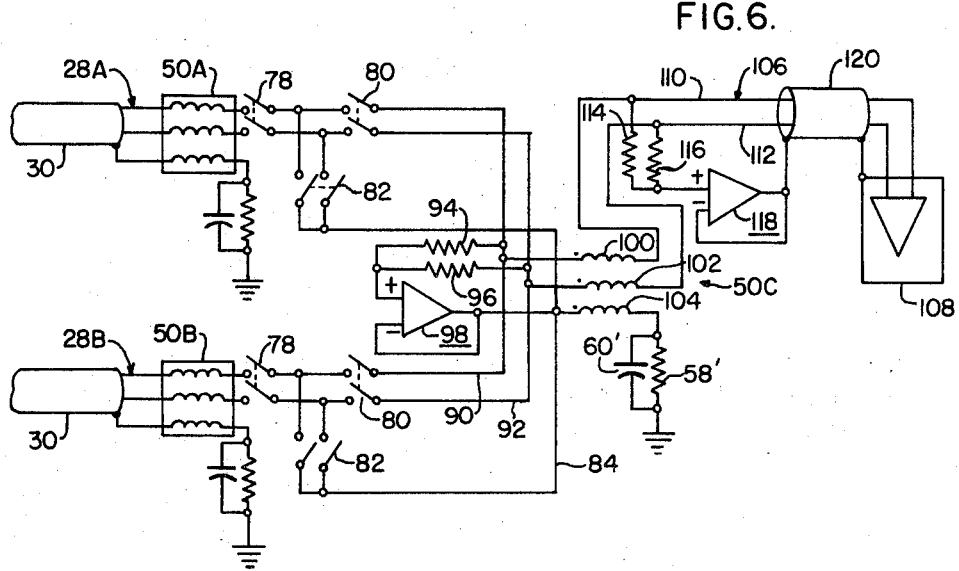
FIG. 6 illustrates another type of multiplexing scheme with which the present invention may be used and incorporating multiple common mode rejection devices.

An alternative method of multiplexing is shown in FIG. 6 wherein elements corresponding to those of FIG. 5 are identified by like reference numerals. In this case, however, the two signal buses 90 and 92 and the shunt switching bus 84 are connected to three windings of a transformer 50C similar to transformers 50A and 50B. In this respect, the winding 104 of transformer 50C is connected to ground through resistor 58' and capacitor 60'; while the windings 100 and 102 of this transformer are connected through transmission line 106 to the input of a utilization device, for example an analog-to-digital converter 108. The two signal conductors 110 and 112 forming transmission line 106 are also connected through equal resistors 114 and 116 to the input of a second voltage follower 118, the output of which is connected to the shield 120 around the transmission line 106. The purpose of this arrangement, of course, is to achieve further reduction of common mode voltages prior to their being applied to the analog-to-digital converter 108.

Reduction of common mode noise of signal conductors 90 and 92 is accomplished by transformer 50C in the same conceptual manner as hereinbefore disclosed with respect to transformers 50, 50A and 50B, that is, two windings 100 and 102 are connected between utilization apparatus and the signal conductors 90 and 92, and a third winding 104 is subjected to a voltage substantially equal to the common mode voltage of the signal conductors. The voltage applied to the winding 104 is derived from the signal conductors 90 and 92 by means of the follower circuit 98 whose output on line 84 is a reproduction of and substantially equal to the common mode voltage of signal conductors 90 and 92.

The output of follower 118 is a reproduction of the common mode voltage on signal lines 110 and 112.

In the embodiment of FIG. 1, a utilization device is shown connected directly to the signal associated windings of transformer 50. On the other hand in FIG. 6 a utilization device 108 is selectively connected to either of the signal associated windings of transformers 50A and 50B through windings 100 and 102 of transformer 50C. In all embodiments shown the circuitry connected to the output terminals of the signal associated windings of any of transformers 50, 50A, 50B and 50C, may be considered utilization circuitry with respect to that transformer and its "input" signal lines.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a signal transmission system including a signal source, a utilization circuit, and a pair of signal conductors for connecting the signal source to the utilization circuit, means for reducing the amount of common mode noise applied to the utilization circuit by the signal conductors, said means comprising:

a. a transformer having a magnetic core and first, second and third inductively coupled windings thereon, all of said windings having the same number of turns, the first winding being connected between an input terminal of the utilization circuit and one of the signal conductors, the second winding being connected between another input terminal of the utilization circuit and the other signal conductor, said first and second windings being twisted together and wound in a bifilar configuration around a portion of the magnetic core, and said third winding being wound around said core separately; and b. means for supplying to the third winding a voltage substantially equal to the common mode voltage of the signal conductor to induce into the first and second windings voltages substantially equal to but in opposition to the common mode voltages of the signal conductors.

2. In a signal transmission system including a signal source, a utilization circuit, and a pair of signal conductors for connecting the signal source to the utilization circuit, means for reducing the amount of common mode noise applied to the utilization circuit by the signal conductors, said means comprising:

a. a transformer having a magnetic core and first, second and third inductively coupled windings thereon, all of said windings having the same number of turns, the first winding being connected between an input terminal of the utilization circuit and one of the signal conductors, the second winding being connected between another input terminal of the utilization circuit and the other signal conductor, and b. means for deriving from the signal conductors a voltage substantially equal to the common mode voltage of the signal conductors and supplying such derived voltage to the third winding as a primary voltage to induce into the first and second windings voltages substantially equal to but in opposition to the common mode voltage of the signal conductors.

3. In a signal transmission system including a signal source, a utilization circuit, and a pair of signal conductors for connecting the signal source to the utilization circuit, means for reducing the amount of common mode noise applied to the utilization circuit by the signal conductors, said means comprising:

a. a transformer having a magnetic core and first and second inductively coupled spaced apart coils on said core, said first coil comprising first and second windings formed of contiguous respective insulated conductors wound together as a composite coil, the first winding being connected between an input terminal of the utilization circuit and one of the signal conductors, the second winding being connected between another input terminal of the utilization circuit and the other signal conductor, said second coil comprising a third winding, all of said windings being inductively coupled and having the same number of turns; and b. means for supplying to the third winding a voltage substantially equal to the common mode voltage of the signal conductors to induce into the first and second windings voltages substantially equal to but in opposition to the common mode voltages of the signal conductors.

4. The combination as in claim 3 wherein said means clause b comprises a voltage follower whose input is connected to the signal conductors and whose output is connected to the third winding.

5. The combination as in claim 3, wherein said means of clause b comprises a third conductor running along said signal conductors, said third conductor being connected to ground at its end nearest the signal source, the other end of the third conductor being connected to one end of the third winding, and means connecting the other end of the third winding to ground.

6. The combination as in claim 5 wherein the third conductor is a shield encircling the signal conductors.

7. The combination as in claim 5 wherein the last-mentioned means comprises an impedance network offering high impedance to direct current and low impedance to common mode noise.

8. The combination as in claim 3 wherein there is means for connecting an end of the third winding to ground.

9. The combination as in claim 2 wherein at least the first and second windings are formed of respective conductors twisted together in multifilar configuration and wound as a composite coil on the transformer core.

10. The combination as in claim 9 wherein the three windings of the transformer are in the form of a trifilar winding comprising three wires twisted together and wound around the transformer core.

11. The combination as in claim 9 wherein said first and second windings are twisted together and wound in a bifilar configuration around a portion of the magnetic core, and said third winding is wound around said core separately.

12. The combination as in claim 3 wherein said transmission system includes a plurality of pairs of signal conductors adapted to be connected to a single electrical utilization device through multiplexing switches and wherein each pair of signal conductors is provided with said means for reducing the common mode noise.

13. The combination as in claim 1 wherein said means of clause b comprises a third conductor running along said signal conductors, said third conductor being connected to ground at its end nearest the signal source, the other end of the third conductor being connected to one end of the third winding, and means connecting the other end of the third winding to ground.

14. The combination as in claim 13 wherein the third conductor is a shield encircling the signal conductors.

15. The combination as in claim 2 wherein said means for deriving in clause b comprises a voltage follower whose input is connected to the signal conductors and whose output is connected to the third winding.

16. The combination as in claim 15 wherein at least the first and second windings are formed of respective conductors twisted together in multifilar configuration and wound as a composite coil on the transformer core.

* * * * *